(12) United States Patent
Ebrahimi Afrouzi

(10) Patent No.: US 10,496,063 B1
(45) Date of Patent: Dec. 3, 2019

(54) METHOD FOR DEVISING A SCHEDULE BASED ON USER INPUT

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 141 days.

(21) Appl. No.: 15/449,660

(22) Filed: Mar. 3, 2017

Related U.S. Application Data

(60) Provisional application No. 62/302,914, filed on Mar. 3, 2016.

(51) Int. Cl.
| | |
|---|---|
| G06F 19/00 | (2018.01) |
| G05B 19/042 | (2006.01) |
| B25J 9/16 | (2006.01) |
| B25J 11/00 | (2006.01) |
| A47L 11/40 | (2006.01) |

(52) U.S. Cl.
CPC ...... *G05B 19/0426* (2013.01); *A47L 11/4011* (2013.01); *B25J 9/161* (2013.01); *B25J 11/0085* (2013.01); *A47L 2201/04* (2013.01); *G05B 2219/25419* (2013.01); *G05D 2201/0203* (2013.01)

(58) Field of Classification Search
CPC ...... G05B 19/0426; G05B 2219/25419; A47L 11/4011; A47L 2201/04; B25J 9/161; B25J 11/0085; G05D 2201/0203

USPC .................................................. 700/245, 257
See application file for complete search history.

(56) References Cited

U.S. PATENT DOCUMENTS

| | | | | |
|---|---|---|---|---|
| 8,954,192 | B2* | 2/2015 | Ozick | A47L 5/30 |
| | | | | 700/258 |
| 8,972,052 | B2* | 3/2015 | Chiappetta | G05D 1/0225 |
| | | | | 700/245 |
| 9,008,835 | B2* | 4/2015 | Dubrovsky | G05B 19/409 |
| | | | | 700/245 |
| 9,050,723 | B1* | 6/2015 | Elazary | G06F 11/0793 |
| 9,114,440 | B1* | 8/2015 | Colucci | B08B 3/024 |
| 9,233,472 | B2* | 1/2016 | Angle | H04L 12/282 |
| 9,375,847 | B2* | 6/2016 | Angle | H04L 12/282 |
| 9,380,922 | B2* | 7/2016 | Duffley | G05D 1/0016 |
| 9,399,290 | B2* | 7/2016 | Francis, Jr. | G05B 23/0221 |
| 9,427,863 | B2* | 8/2016 | Lee | B25J 9/0003 |
| 9,603,499 | B2* | 3/2017 | Friedman | A47L 9/009 |
| 9,656,387 | B2* | 5/2017 | Mian | B25J 9/16 |
| 9,782,050 | B2* | 10/2017 | Kim | G06T 7/97 |
| 9,789,605 | B2* | 10/2017 | Meier | B25J 9/1602 |
| 9,877,630 | B2* | 1/2018 | Wolfe | A47L 9/2805 |
| 9,919,420 | B1* | 3/2018 | Theobald | B25J 9/161 |
| 9,974,422 | B2* | 5/2018 | Lee | A47L 9/2815 |
| 2007/0192910 | A1* | 8/2007 | Vu | B25J 5/007 |
| | | | | 700/245 |

* cited by examiner

*Primary Examiner* — Ronnie M Mancho

(57) ABSTRACT

A schedule development method for a robotic floor-cleaning device that attempts to recognize patterns in user input to automatically devise a work schedule.

12 Claims, 1 Drawing Sheet

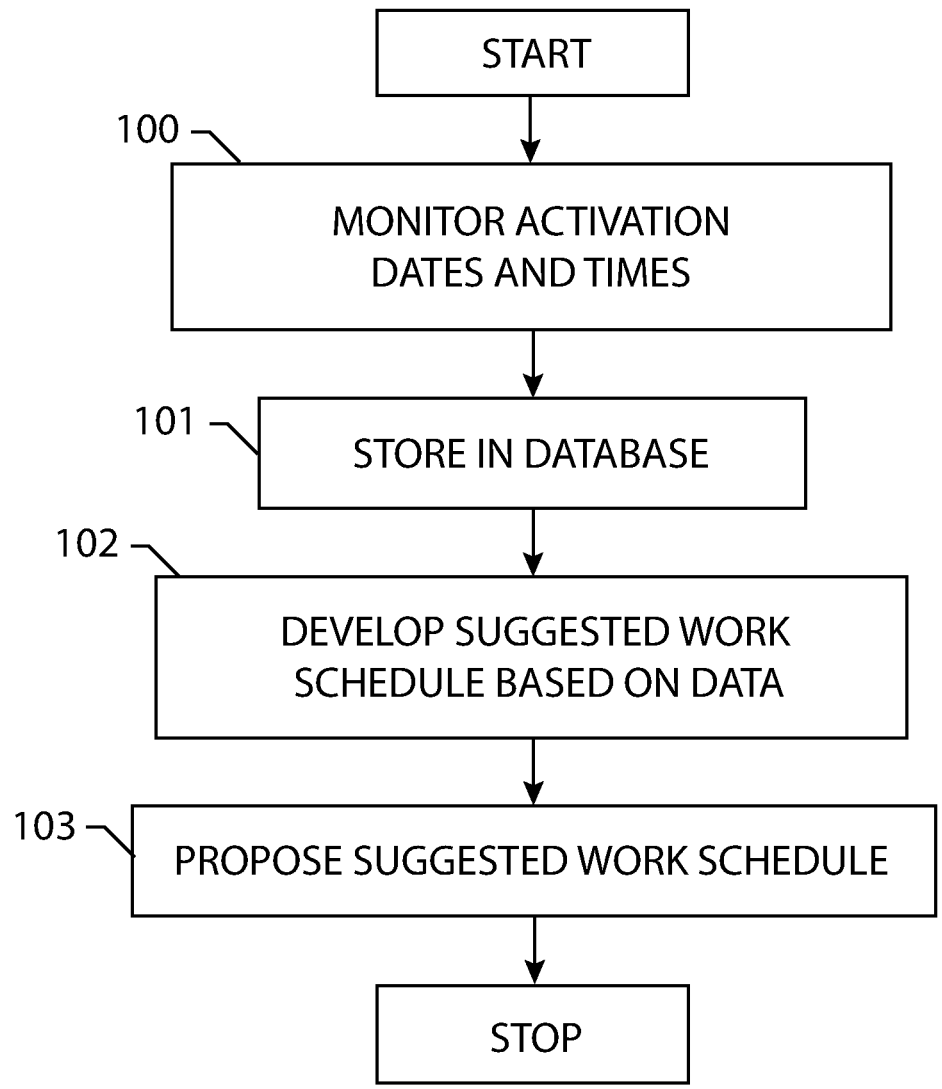

METHOD FOR DEVISING A SCHEDULE BASED ON USER INPUT

CROSS-REFERENCE TO RELATED APPLICATIONS

This application claims the benefit of provisional patent application Ser. No. 62/302,914 filed Mar. 3, 2016 by the present inventor.

FIELD OF INVENTION

The present invention relates to methods for devising schedules for robotic floor cleaning devices based on historical data.

BACKGROUND

In prior art, many robotic floor-cleaning devices have scheduling systems that allow users to input schedules so that a robotic floor-cleaning device turns on automatically at a preset time. Alternatively, a user may simply turn on a robotic floor-cleaning device to begin work at any time. Some users may benefit from a robotic floor-cleaning device that operates on a schedule but do not want to take the time or energy to set up the schedule. A need exists for a method to automatically devise a robotic floor-cleaning device work schedule based on user inputs.

SUMMARY

It is a goal of the present invention to provide a schedule development method for a robotic floor-cleaning device that automatically devises a work schedule based on historical data. The aforementioned goal is achieved by recording user inputs about when to start work and the corresponding days and times. The system then develops a work schedule for future work based on the recorded inputs.

BRIEF DESCRIPTION OF DRAWINGS

FIG. 1 illustrates the process of devising a suggested work schedule embodying features of the present invention.

DETAILED DESCRIPTION OF THE INVENTION

The present invention discloses a robotic floor cleaning device, comprising: a shell; a chassis; a set of wheels; a motor to drive the wheels; a control device to activate and control the robotic floor cleaning device's movement, a clock, a memory unit to store data, an input/output means connected to the control unit and a cleaning unit connected to the chassis. The control unit is configured to save a date and time set by a user when the robotic floor cleaning device should be turned on. The control unit is further configured to suggest a work schedule based on the saved data to the user using the input/output means.

The present invention discloses a method for setting a work schedule for a robotic floor cleaning device comprising: monitoring use times of a robotic floor cleaning device over a preset period of time; storing the times and dates the robotic floor cleaning device was turned on in a database; developing a suggested work schedule based on the stored data; proposing the suggested work schedule to users through an input/output device.

In some embodiments, the method comprises: monitoring use times of a robotic floor cleaning device over a preset period of time; storing the times and dates the robotic floor cleaning device was turned on in a database; devising a suggested work schedule from the stored data using a machine learning technique; proposing the suggested work schedule to users through an input/output device; accepting user adjustments to the suggested work schedule through the input/output device; adding the user adjustment data to the database for use in devising future work schedules.

One skilled in the art will appreciate that different embodiments of the invention can use different machine learning techniques such as but not limited to: Supervised learning, Unsupervised learning, Reinforcement learning, semi-supervised learning, etc.

In some embodiments, the input/output device is wireless and can send and receive signals to and from remote devices, such as, for example remote controls and smartphones.

In some embodiments, the floor cleaning device may be scheduled directly via a user interface positioned thereon.

In some embodiments, inputs from a user and outputs from the robotic floor cleaning device may be provided through a software application installed on an internet-connected device, such as a smartphone, a computer, or a tablet.

I claim:

1. A method for developing a schedule for a robotic floor-cleaning device comprising:
   receiving, by a control unit of the robotic floor-cleaning device, at least one date and time to operate the robotic floor-cleaning device from an input-output device;
   storing, by the control unit of the robotic floor-cleaning device, the at least one date and time in a database;
   inferring, by the control unit of the robotic floor-cleaning device, a work schedule of the robotic floor-cleaning device using a reinforcement learning model;
   transmitting, by the control unit of the robotic floor-cleaning device, the inferred work schedule to the input-output device;
   receiving, by the control unit of the robotic floor-cleaning device, adjustments to the inferred work schedule from the input-output device; and,
   updating, by the control unit of the robotic floor-cleaning device, at least one input to the reinforcement learning model based on the contents of the database and adjustments to the inferred work schedule.

2. The method of claim 1, wherein the input-output device comprises one or more of: a dedicated remote control, an interface on the robotic floor-cleaning device, a software interface on a computer, a software interface on a smartphone, and a software interface on a tablet.

3. The method of claim 1, further comprising storing the inferred work schedule in the database and updating the inferred work schedule stored in the database based on the adjustments to the inferred work schedule.

4. The method of claim 1, wherein scheduling information is received from and transmitted to a software application of the input-output device.

5. A robotic floor-cleaning device, comprising:
   a chassis;
   a set of wheels coupled to the chassis and driven by one or more motors;
   one or more control units; and,
   one or more tangible, non-transitory, machine-readable medium storing instructions that when executed by the one or more control units effectuate operations comprising:

receiving, by the control unit of the robotic floor-cleaning device, at least one date and time to operate the robotic floor-cleaning device from an input-output device;

storing, by the control unit of the robotic floor-cleaning device, the at least one date and time in a database;

inferring, by the control unit of the robotic floor-cleaning device, a work schedule of the robotic floor-cleaning device using a reinforcement learning model;

transmitting, by the control unit of the robotic floor-cleaning device, the inferred work schedule to the input-output device;

receiving, by the control unit of the robotic floor-cleaning device, adjustments to the inferred work schedule from the input-output device; and, updating, by the control unit of the robotic floor-cleaning device, at least one input to the reinforcement learning model based on the contents of the database and adjustments to the inferred work schedule.

6. The robotic floor-cleaning device of claim 5, wherein the input-output device comprises one or more of: a dedicated remote control, an interface on the robotic floor-cleaning device, a software interface on a computer, a software interface on a smartphone, and a software interface on a tablet.

7. The robotic floor-cleaning device of claim 5, further comprising storing the inferred work schedule in the database and updating the inferred work schedule stored in the database based on the adjustments to the inferred work schedule.

8. The robotic floor-cleaning device of claim 5, wherein scheduling information is received from and transmitted to a software application of the input-output device.

9. One or more tangible, non-transitory, machine-readable medium storing instructions that when executed by the one or more control units of a robotic floor-cleaning device effectuate operations comprising:

receiving, by the one or more control units of the robotic floor-cleaning device, at least one date and time to operate the robotic floor-cleaning device from an input-output device;

storing, by the one or more control units of the robotic floor-cleaning device, the at least one date and time in a database;

inferring, by the one or more control units of the robotic floor-cleaning device, a work schedule of the robotic floor-cleaning device using a reinforcement learning model;

transmitting, by the one or more control units of the robotic floor-cleaning device, the inferred work schedule to the input-output device;

receiving, by the one or more control units of the robotic floor-cleaning device, adjustments to the inferred work schedule from the input-output device; and, updating, by the one or more control units of the robotic floor-cleaning device, at least one input to the reinforcement learning model based on the contents of the database and adjustments to the inferred work schedule.

10. The one or more media of claim 9, wherein the input-output device comprises one or more of: a dedicated remote control, an interface on the robotic floor-cleaning device, a software interface on a computer, a software interface on a smartphone, and a software interface on a tablet.

11. The one or more media of claim 9, further comprising storing the inferred work schedule in the database and updating the inferred work schedule stored in the database based on the adjustments to the inferred work schedule.

12. The one or more media of claim 9, wherein scheduling information is received from and transmitted to a software application of the input-output device.

\* \* \* \* \*